United States Patent
Jackson et al.

(10) Patent No.: US 9,751,019 B2
(45) Date of Patent: Sep. 5, 2017

(54) INPUT METHODS AND DEVICES FOR MUSIC-BASED VIDEO GAMES

(71) Applicants: Jamie Jackson, Santa Monica, CA (US); David Osbourn, Santa Monica, CA (US); Neil Wigfield, Santa Monica, CA (US); Joel Davey, Santa Monica, CA (US); Nathan Coppard, Santa Monica, CA (US); Andy Bastable, Santa Monica, CA (US)

(72) Inventors: Jamie Jackson, Santa Monica, CA (US); David Osbourn, Santa Monica, CA (US); Neil Wigfield, Santa Monica, CA (US); Joel Davey, Santa Monica, CA (US); Nathan Coppard, Santa Monica, CA (US); Andy Bastable, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 475 days.

(21) Appl. No.: 14/133,492

(22) Filed: Dec. 18, 2013

(65) Prior Publication Data

US 2015/0165309 A1   Jun. 18, 2015

(51) Int. Cl.
*A63F 13/00* (2014.01)
*A63F 13/814* (2014.01)
(Continued)

(52) U.S. Cl.
CPC ............ *A63F 13/814* (2014.09); *A63F 13/21* (2014.09); *A63F 13/211* (2014.09);
(Continued)

(58) Field of Classification Search
CPC ...... A63F 13/21; A63F 13/211; A63F 13/213; A63F 13/428; A63F 13/52; A63F 13/525;
(Continued)

(56) References Cited

U.S. PATENT DOCUMENTS

| 7,071,914 B1 * | 7/2006 | Marks | G06F 3/017 |
| | | | 345/156 |
| 8,721,441 B1 * | 5/2014 | Chen | A63F 13/814 |
| | | | 463/35 |

(Continued)

OTHER PUBLICATIONS

Daily Mail Reporter. Dec. 12, 2012 Sandy concert line up: Alicia Keys, Bruce Springsteen, Bon Jovi and Kanye West rock out [online]. Dec. 14, 2012 [retrieved Aug. 1, 2016]. Retrieved from the Internet: <URL: http://www.dailymail.co.uk/news/article-2247298/12-12-12-Sandy-concert-line-Alicia-Keys-Bruce-Springsteen-Bon-Jovi-Kanye-West-rock-out.html>.*

(Continued)

*Primary Examiner* — Dmitry Suhol
*Assistant Examiner* — David Duffy
(74) *Attorney, Agent, or Firm* — Klein, O'Neill & Singh, LLP

(57) ABSTRACT

A music-based video game provides for game play based, in part, on a game player's physical performance. The game player's physical performance can be used to modify game play aspects and game play events, for example, the view or behavior of a crowd scene. A representation of a musician may be provided, with the musician mimicking movements of the game player.

8 Claims, 11 Drawing Sheets

(51) Int. Cl.
*A63F 13/52* (2014.01)
*A63F 13/213* (2014.01)
*A63F 13/211* (2014.01)
*A63F 13/428* (2014.01)
*A63F 13/21* (2014.01)
*A63F 13/525* (2014.01)
*A63F 13/245* (2014.01)

(52) U.S. Cl.
CPC .......... *A63F 13/213* (2014.09); *A63F 13/245* (2014.09); *A63F 13/428* (2014.09); *A63F 13/52* (2014.09); *A63F 13/525* (2014.09); *A63F 2300/105* (2013.01); *A63F 2300/1087* (2013.01); *A63F 2300/6661* (2013.01); *A63F 2300/8047* (2013.01)

(58) Field of Classification Search
CPC .............. A63F 13/814; A63F 2300/105; A63F 2300/1087; A63F 2300/8047; A63F 2300/6661
See application file for complete search history.

(56) References Cited

U.S. PATENT DOCUMENTS

| | | | | |
|---|---|---|---|---|
| 2002/0065121 | A1* | 5/2002 | Fukunaga | A63F 13/08 463/8 |
| 2006/0009979 | A1* | 1/2006 | McHale | A63F 13/10 704/270 |
| 2007/0256541 | A1* | 11/2007 | McCauley | G10H 1/0066 84/600 |
| 2008/0242415 | A1* | 10/2008 | Ahmed | A63F 13/00 463/39 |
| 2009/0156306 | A1* | 6/2009 | Guinchard | A63F 13/06 463/37 |
| 2009/0258700 | A1* | 10/2009 | Bright | A63F 13/10 463/31 |
| 2009/0258705 | A1* | 10/2009 | Guinchard | A63F 13/02 463/37 |
| 2010/0033426 | A1* | 2/2010 | Grant | A63F 13/06 345/156 |
| 2010/0197395 | A1* | 8/2010 | Geiss | A63F 13/10 463/31 |
| 2010/0248832 | A1* | 9/2010 | Esaki | A63F 13/06 463/36 |
| 2010/0302145 | A1* | 12/2010 | Langridge | A63F 13/06 345/157 |
| 2011/0003638 | A1* | 1/2011 | Lee | G09B 15/00 463/35 |
| 2011/0093820 | A1* | 4/2011 | Zhang | A63F 13/06 715/863 |
| 2012/0214587 | A1* | 8/2012 | Segal | A63F 13/211 463/30 |
| 2015/0080072 | A1* | 3/2015 | Kim | A63F 13/213 463/7 |

OTHER PUBLICATIONS

TV Tropes: Audience Participation Song [online], Oct. 31, 2012 [retrieved on Aug. 2, 2016]. Retrieved from the Internet: <URL: https://web.archive.org/web/20121031210459/http://tvtropes.org/pmwiki/pmwiki.php/Main/AudienceParticipationSong>.*

* cited by examiner

INPUT METHODS AND DEVICES FOR MUSIC-BASED VIDEO GAMES

BACKGROUND OF THE INVENTION

The present invention relates generally to video games, and more particularly to input methods and devices for music-based video games.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video game systems have traditionally utilized a variety of input controllers to allow a game player to interact with the game, including, for example, joysticks, gamepads, keyboards, mice, trackballs, touch screens, or other known controllers. By operating such controllers, the video games allow game players to experience activities, at least to an extent, that the game players may otherwise be unable or incapable of taking part in.

In many instances, traditional input controllers are adapted for use with a wide variety of video games. The use of generic controllers is convenient, allowing a game player to use a single controller with a wide variety of video games and simulated activities. The use of generic input controllers may, however, detract from the experience of a simulated activity, considering that a generic controller may not in fact be utilized in the activities being simulated.

One genre of video games is the music-based video game, also referred to as rhythm-action games or rhythm games. Music-based video games often present instructive cues for manipulation of buttons and the like on an input controller, with the video game providing music and increasing a game player's score if the game player complies with the instructive cues. In addition, a simulated crowd response may be provided, with the response of the crowd varying depending on extent of compliance by the game player with the instructive cues. Further, in many cases, the controller is generally configured to be similar to a musical instrument, increasing realism of the simulated activity of playing, performing, or creating a song.

Such music-based video games, however, may not sufficiently present to a game player the full experience of playing a song, particularly before an audience.

BRIEF SUMMARY OF THE INVENTION

The invention provides input methods and devices for a music-based video game.

In one aspect, the invention provides a method of conducting a music-based video game, comprising: commanding presentation of a game scene on a display; commanding presentation of instructive cues for operation of a controller; determining compliance with the instructive cues by a game player operating the controller; determining a change in the game player's orientation; and commanding a change in the presentation of the game scene, wherein the change in the presentation of the game scene corresponds to the change in the game player's orientation.

In another aspect the invention provides, the method further comprises: determining a movement of the game player, wherein the movement of the game player is different from the change in the game player's orientation; and commanding the execution of a game play event in response to the movement of the game player.

In another aspect the invention provides, a method, performed by a compute device, useful in providing video game play, comprising: commanding presentation of a game scene on a display, the game scene including a representation of a crowd of people viewing a performance; determining information regarding a pose of a game player playing the video game; modifying the representation of the crowd of people based on the information regarding the pose of the game player.

In another aspect the invention provides a method performed by a compute device useful in providing video game play of a music-based video game, comprising: commanding presentation of instructive cues for operation of a controller; determining compliance with the instructive cues by a game player operating the controller; commanding presentation of a game scene, the game scene being a representation from a point of view of a game world including an audience of a musical performance; determining a change in orientation of a game player; and commanding a change in the presentation of the game scene to reflect a change in the point of view based on the change in orientation of the game player.

In another aspect the invention provides a method performed by a compute device useful in providing video game play, comprising: commanding presentation of a game scene on a display, the game scene including a representation of a crowd of people viewing a performance; determining information regarding motion of a game player playing the video game; modifying the representation of the crowd of people based on the information regarding the motion of the game player.

These and other aspects of the invention are more fully comprehended upon review of this disclosure.

DETAILED DESCRIPTION

Figure 1A:
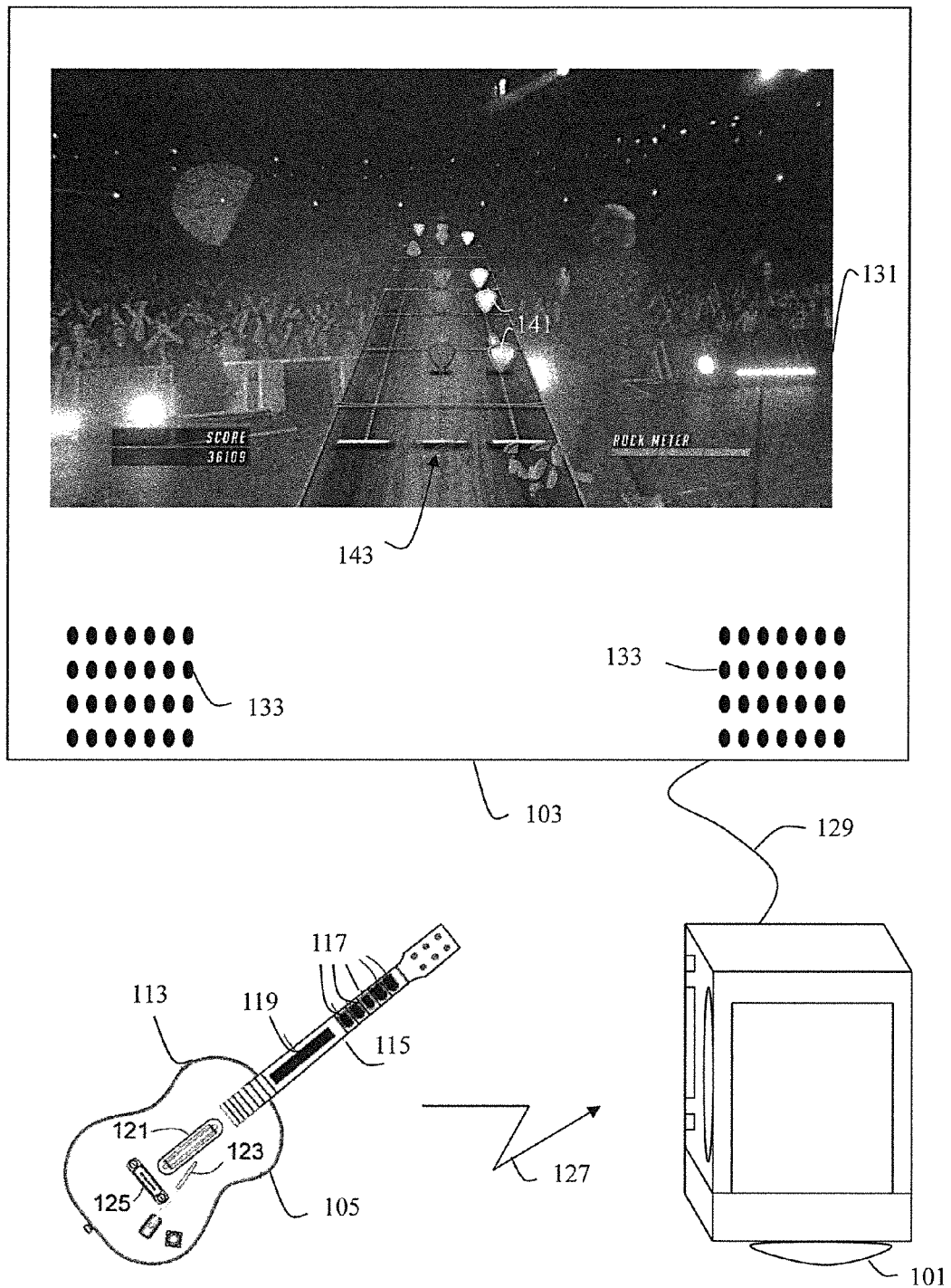
FIG. 1A illustrates an example of a video game system in accordance with aspects of the invention.
Figure 1B:
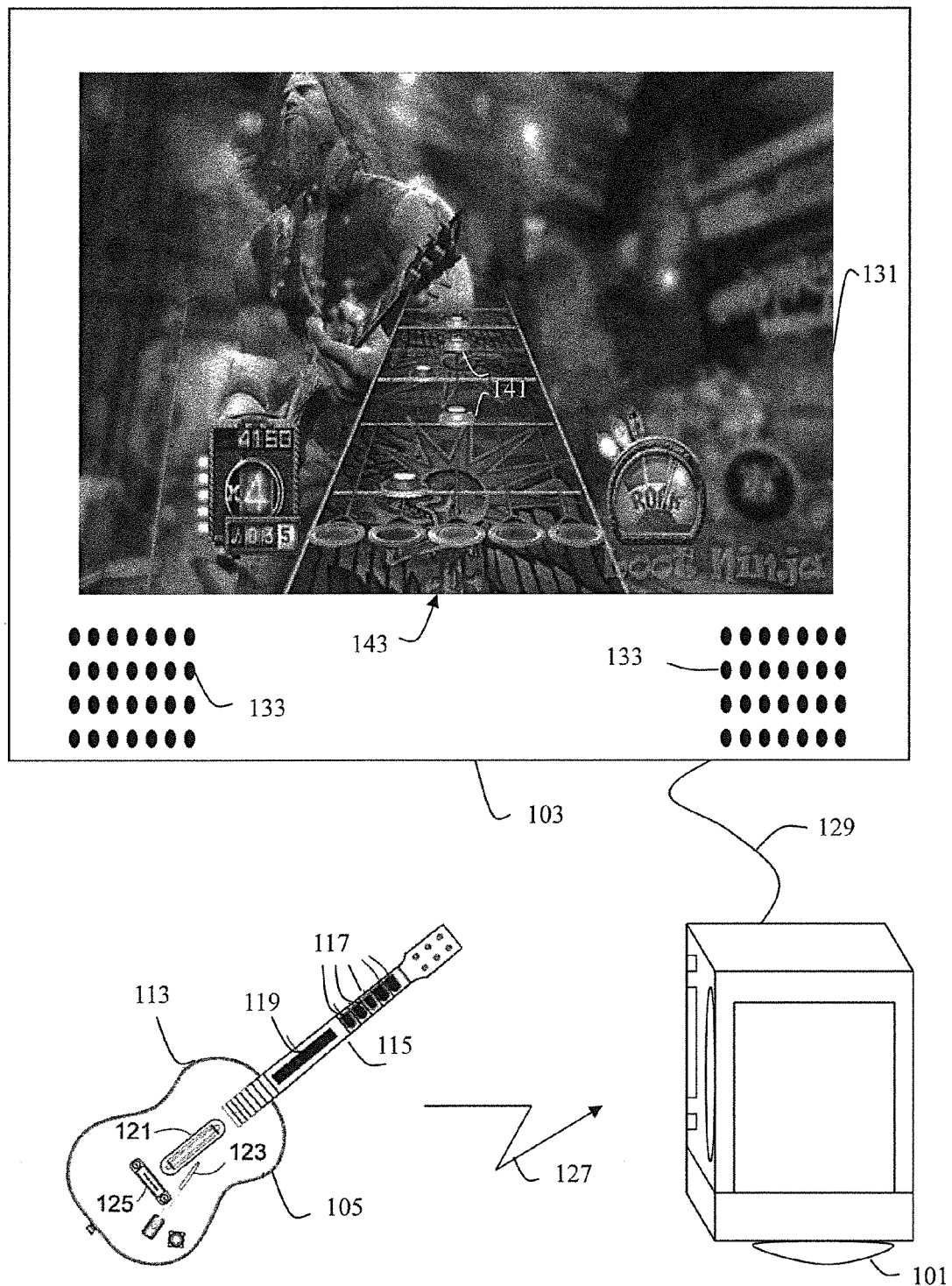
FIG. 1B illustrates an example of a video game system in accordance with aspects of the invention.

FIGS. 1A and 1B are examples of video game systems in accordance with aspects of the invention. To the extent elements of FIGS. 1A and 1B share the same numbering, discussion relating to those elements applies to both figures.

The video game system of FIG. 1A includes a video game console 101, a display 103, and a controller 105. The video game console includes internal circuitry, which allows the console to run a video game by executing various program instructions related to proper execution of the video game. The video game console typically includes one or more processors, memory, and various interface circuitry.

The instructions providing for game play are generally stored on removable media, for example, an optical disk. Accordingly, the game console may include an optical drive, for example, a DVD-ROM, CD-ROM, Blu-ray drive, or similar device, for reading the instructions for game play. In some embodiments, the removable media may be a flash memory data storage device. In other embodiments, the instructions providing for game play may be stored in a remote server that is accessed over one or more networks. In yet other embodiments, the instructions providing for game play may be stored on the local memory of the video game console.

In some embodiments, the video game console may be a traditional video game console such as a Microsoft Xbox, Sony Playstation, Nintendo Wii, or similar. The video game console may be considered a compute device, and in various embodiments may be replaced by other compute devices. In various embodiments a compute device may be considered as broadly encompassing various computing devices suitable for playing video games. In some embodiments, the compute device may be a personal computer running any of a variety of known operating systems (e.g., Microsoft Windows, Mac OS, UNIX, Linux, etc.). In some embodiments, the compute device may be a handheld or portable device capable of playing video games, such as a mobile PC, laptop, tablet, mobile gaming device, smart phone, or mobile phone. The handheld or portable device may include similar or identical internal circuitry as herein described, as well as, for example, one or more displays, which may be a built-in display or a projected display, and various different game player input controllers, which may be part of the handheld or portable device.

The video game console of FIG. 1A is coupled to the controller by a wireless connection 127. In many embodiments, the controller and video game console may be coupled by a wired connection. In addition, the controller illustrated in FIG. 1A is in the shape of a guitar. In various embodiments, other controllers may instead or additionally be used, including generic controllers, microphones, drums, drumsticks, keyboards, DJ turntables, dance pads or mats, other guitar-shaped controllers, or controllers in the general form of other musical instruments.

Figure 1C:
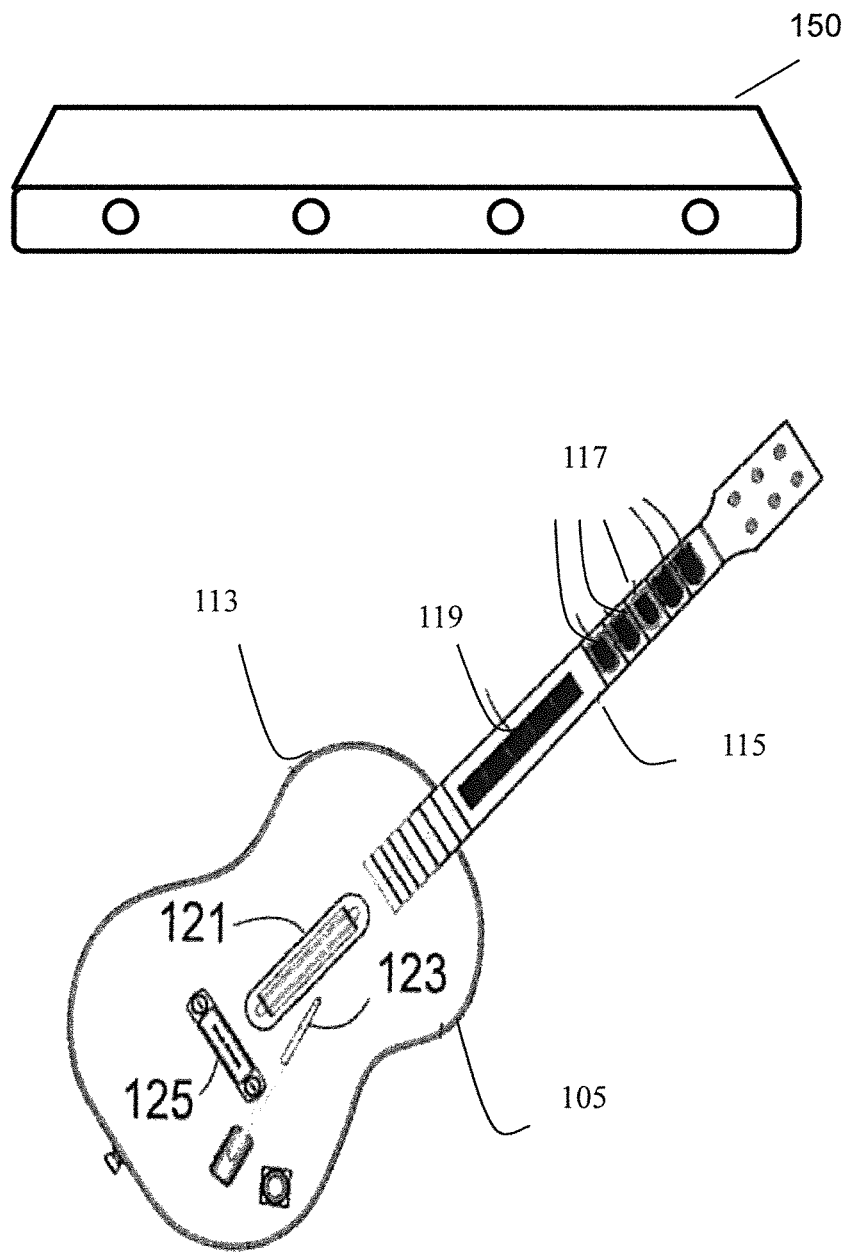
FIG. 1C illustrates an example of an input controller in accordance with aspects of the invention.

FIG. 1C illustrates an example of a guitar-shaped controller 105 in accordance with aspects of the present invention. In some embodiments, the controller 105 comprises a body 113 and neck 115. Controller 105 may further comprise various input buttons that permit the game player to interact with the video game console, such as strum bar 121, whammy bar 123, fret buttons 117, neck input 119, and controller buttons 125.

In some embodiments, controller 105 comprises one or more position or motion sensing devices, which determine the position or motion of the controller and/or game player, and allow the game player to interact with the video game console using physical movements. Position and motion sensing devices may include, for example, one or more gyroscopes, accelerometers, altimeters, geomagnetic sensors, magnetometers, optical or infrared projectors and transceivers, depth-sensing cameras, global positioning systems, thermal imaging systems, or any other similar device that generates signals provided to the video game console from which the video game console can determine position or motion of the controller and/or game player. In some embodiments, the position or motion sensing device may be worn by the game player. It should be recognized that some sensing devices sense position related information, and some sensing devices sense motion related information. In many instances the position related information may be used to determine motion, and the motion related information may be used to determine position, for example using circuitry, including processors, configured to perform appropriate calculations. This circuitry may be separately included in conjunction with the sensors, or the calculations may be performed in whole or in part by the compute device. Accordingly, at times herein, the term "motion" may be used broadly to encompass motion, position, posture, orientation, and location. Examples of systems incorporating exemplary motion sensing devices include the Nintendo Wii and Wii U, Sony PlayStation Move, and Microsoft Kinect platforms. In the embodiment illustrated in FIG. 1C, controller 105 may include, for example, one or more gyroscopes, accelerometers, and magnetometers (not shown). Controller 105 of FIG. 1C also includes a depth-sensing camera 150. Depth-sensing camera 150 may be used, for example, to detect the motion information relating to controller 105 and/or one or more game players.

Figure 1D:
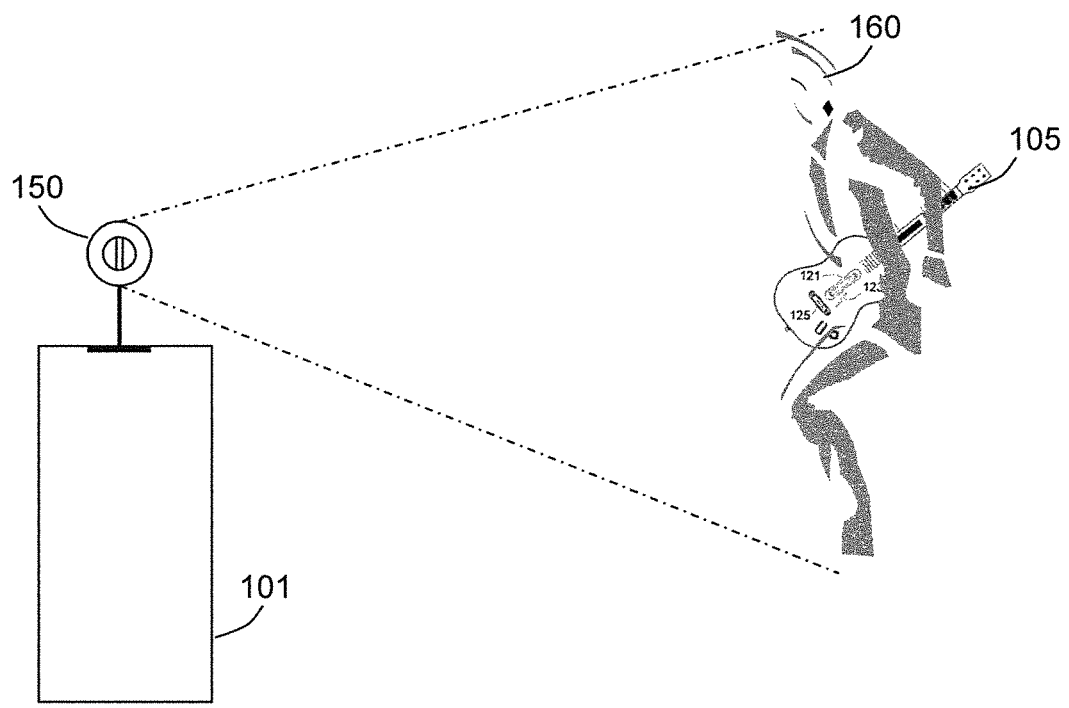
FIG. 1D illustrates an example motion determination system using a camera in accordance with aspects of the invention.

FIG. 1D shows a further configuration for providing a video game console with motion related signals. The configuration of FIG. 1D includes a video game console 101. An imaging device 150 is coupled to the video game console. In various embodiments, the imaging device is a visible light imaging device, for example a web camera, an infrared imaging device, a thermal imaging device, depth-sensing camera, or some combination of those devices. A game player 160 is within the field of view of the imaging device, and the game player is holding a controller 105. The controller 105, as illustrated, is in the shape of a guitar, although in various embodiments other controllers may be used.

In the embodiment of FIG. 1D, the video game console includes image analysis program instructions, which may be provided by way of program instructions on a removable media such as a CD-ROM on which program instructions for a video game are provided. The image analysis program may determine position of the controller and/or the game player. In some embodiments, the controller and/or the game player may be provided light, thermal, or infrared emitting devices, reflective items, or other devices to increase ease of processing of the image analysis program.

Again referencing FIG. 1A, the video game console is also in communication with a display unit 103, generally through an audio-video cable or similar wired connection, although a wireless connection may be used in some embodiments. Display unit 103 is generally some television or monitor. In many embodiments, the display unit 103 is a liquid crystal display (LCD), light-emitting diode (LED) display, or some other flat-panel display. In some embodiments, the display unit 103 is integrated with the video game console. The display unit generally comprises a display screen 131 and at least one audio output device, such as a speaker 133. In the embodiment of FIG. 1A, the display screen shows a screen shot of video game play in a music-based video game.

As illustrated in FIG. 1A, the display shows a screenshot of an example music-based video game in accordance with aspects of the present invention. In the particular screenshot of FIG. 1A, the display includes a plurality of instructive cues 141. The instructive cues generally scroll across portions of the screen towards and into a predefined area of the screen, such as the NOW area 143. Although the screenshot of FIG. 1A shows the instructive cues scrolling in a substantially vertical direction, the instructive cues may scroll in any direction or along an arbitrary path. The display also shows a game scene, in this case a music concert scene, viewed from the viewpoint of an in-game performer representative of the game player. The music concert scene may be considered a scene of a music concert game world, with the game world including a crowd of people providing an audience for a musical performance. The viewpoint of the in-game performer may be considered a point of view in the game world, to be used in determining the game scene to be displayed. In some embodiments, and as shown in the FIG. 1B, the display may show one or more video game characters as in-game performers representative of one or more game players.

During video game play, a game player is to depress or have depressed various buttons and/or utilize a strum bar or other user manipulable input device of the controller responsive to the instructive cues, generally when the instructive cues reach a predefined area of the display such as the NOW area 143. In most embodiments, the video game console evaluates the game player's performance based on the extent of the game player's compliance with the operations commanded by the instructive cues. In addition, the video game console generally commands presentation of audio during video game play. In most embodiments, audio of a musical selection is provided if the game player complies with the instructive cues, and silence, which in some embodiments may be a lack of audio of part of the musical selection, or a sound associated with a missed note may be provided if the game player does not comply with the instructive cues. Whether silence or a sound associated with a missed note is provided may depend, for example, on whether the game player operates incorrect input commands or does not operate any input device. In various embodiments the presentation of audio may also include audio from a crowd of the game world, with for example the crowd being an audience for a musical performance.

Figure 8A:
FIGS. 8A and 8B illustrate example video game scenes in which the motion of the controller and/or the game player is used to control the motion and/or actions of an in-game character.
Figure 8B:

The video game console also determines and evaluates the motion of the controller and/or the game player, providing a physical performance aspect to video game play. In accordance with aspects of the invention, the motion of the controller and/or the game player may be used to affect game play. In some embodiments, when the game scene is rendered from a viewpoint (in a game world) simulating a first-person perspective, the motion of the controller and/or the game player may result in corresponding changes to the viewpoint. For instance, upon determining that the game player has tilted his head up (or down), the video game console may execute instructions that rotate the viewpoint up (or down). Likewise, upon determining that the game player has turned his body left (or right), the video game console may execute instructions that rotate the viewpoint left (or right). FIGS. 8A and 8B illustrate using the motion of the controller and/or the game player to control the motion and/or actions of an in-game character. FIG. 8A shows the game scene from a first viewpoint based in part on game player positioning. When the game player turns his/her body to the right, the game scene changes and rotates correspondingly to the right. The resulting viewpoint, in which the backstage area is now partially visible, is shown in FIG. 8B.

In another example, the motion of the controller and/or the game player may be used to control the motion and/or actions of an in-game character. That is, the in-game character may be programmed to move or act in response to determined motions of the controller and/or the game player. For example, upon determining that the game player has turned to the left (or right), the video game console may execute instructions that turn the in-game character to its left (or right). In yet another example, upon determining that the game player raised his hand, the video game console may execute instructions that raise the hand of the in-game character. In some embodiments, a particular movement of a controller and/or game player may be programmed to cause the in-game character to perform an action that does not mimic the controller's and/or game player's motion. For example, the motion of a game player raising the controller over his head or raising his first may be programmed to cause the in-game character to jump from the stage into the crowd. In some embodiments virtually any motion of the controller and/or the game player may be programmed to correspond with virtually any in-game character action. In some embodiments, game player movements only movements are only used if they exceed a certain threshold degree of movement. For example, head tilt movements that are less than a predefined number of degrees can be programmed not to affect the in-game viewpoint. Likewise, game player rotation to the left or right that are less than a predefined number of degrees may be programmed to not affect the in-game viewpoint.

In addition to controlling the motion and/or actions of an in-game character, the motion of the controller and/or the game player may be programmed to correspond to in-game events. In one embodiment, the motion of the controller and/or game player may be used to direct crowd responses. If the video game console determines, for example, that the game player is waving his hand from side to side, the video game console may cause crowd members of the game world to also wave their hands from side to side. As another example, if the game player claps his hands, the video game console may cause crowd members to also clap their hands. As yet another example, if a game player raises his hand above his head, the video game console may cause crowd members to raise an illuminated light, for example a lighter or cell phone above their heads. Similarly, if the video game console detects that the game player has pointed his finger and/or hand at the display (or pointed the controller such as a microphone or guitar at the display), the video game console may cause the crowd to react by, for example, singing along or cheering more actively, or with greater or lesser volume. In some embodiments, the motion of the controller and/or game player may be used to trigger in-game effects such as effects simulating stadium lighting or pyrotechnics. In various embodiments virtually any motion of the controller and/or the game player may be programmed to correspond with virtually any in-game event.

In some embodiments, the game player is provided an increase in score if the motion of the controller and/or game player matches a predefined motion. For example, if the motion of the controller and/or game player matches a predefined motion, the score the game player may obtain for complying with instructive cues may be increased or multiplied during or as a result. In some embodiments, the motion of the controller and/or game player must comply with certain instructive cues in order to obtain the increased score or score multiplier.

In some embodiments, the video game console determines and evaluates the motion of the controller and/or game player by determining if the controller or game player has moved through a sequence of positions. The sequence of positions may include one or more intermediate positions between an initial position and a final position. Motion of the controller may include rotating or translating the position of the controller. In addition to those described above, a predefined motion or sequence of motions may include for example, raising the controller at least a predefined distance, moving the controller laterally at least a predefined distance, or moving the controller through a predefined sequence of positions or through any of a plurality of predefined sequence of positions. For example, a predefined motion or sequence of motions may include spinning the controller or sequentially raising and lowering the controller. In addition to those described above, the motion of the game player may include jumping, spinning/rotating, kicking, punching, head movements, or lateral movements of the game player. The motion of the game player may also include the game player achieving certain poses. Examples of such poses include the game player putting his hands on his hips, raising his hands above his head, giving a "thumbs up" signal or an "OK" signal, etc. In some embodiments, the movement of the controller may be used as a proxy for the movement of the game player, with movement of the controller indicating corresponding movement of the game player.

Figure 2:
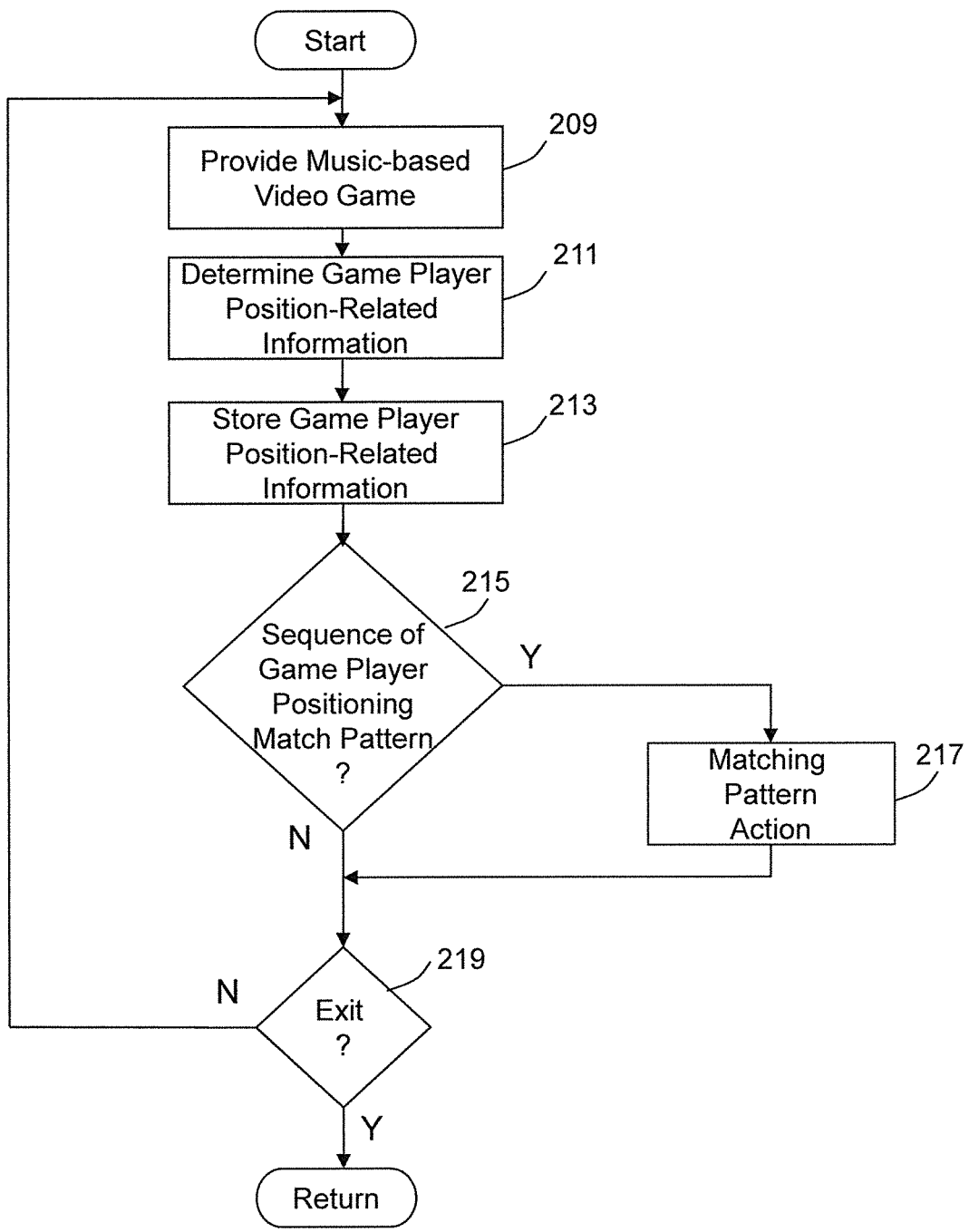
FIG. 2 is a flow diagram of a process of providing a music-based video game in accordance with aspects of the invention.

FIG. 2 is a flow chart of video game operations in accordance with aspects of the invention. The process may be performed by the video game console of FIGS. 1A and 1B, or a processor of the video game console, for example as discussed below with respect to FIG. 3.

In block 209 the process provides for music-based video game play. In many embodiments, the process commands display of instructive cues and evaluates game player compliance with the instructive cues, for example, based on input signals provided by a controller operated by the game player. In many embodiments, the process also commands presentation of audio of a song or portions of a song, with the extent of presentation of the song dependent on the extent of compliance by the game player with the instructive cues. The process may also provide features of music-based video game play commonly found in music-based video games. In most embodiments, the process provides for music-based video game play throughout or substantially throughout operation of the process.

Blocks 211-217 relate to motion-related processing during music-based video game play. The motion-related processing determines and evaluates the motion of a controller and/or game player during game play. The motion may be responsive to a prompt provided during music-based video game play, for example, an instructive cue, a motion of or expression by a game character, or some other visual, auditory, or other prompt. Alternatively, the motion may be independent of a prompt provided during game play.

In block 211, the process determines information indicative of a game player and/or controller position, location, and/or orientation (collectively, "game player position-related information"). In some embodiments, the controller's position, location and/or orientation may be utilized as a proxy for game player position, location, and/or orientation. In some embodiments, information relating to both the game player and controller may be determined. For purposes of simplicity of exposition, however, reference in this example shall be primarily to the game player's position-related information. In some embodiments, the process determines game player position-related information based on input signals generated by a depth-sensing camera or other optical device. In block 213, the process stores the game player position-related information. In some embodiments, the game player position-related information is determined relative to a previously stored instance of game player position-related information.

In block 215, the process determines if a sequence of stored game player position-related information matches a predefined pattern of positions. The predefined pattern may be indicative of a movement or movements of the game player. The movement or movements of the game player may be lateral movements, rotations of the body or head, poses, movements of specific limbs, or some combination of these movements. In some embodiments, the predefined pattern may be only a single predefined pattern, but in many embodiments, the predefined pattern may be any of a plurality of predefined patterns. In some embodiments, the number of stored game player positions may vary from pattern to pattern. If in block 215 the process determines that a sequence of stored positions matches a predefined pattern the process proceeds to block 217, otherwise the process proceeds to block 219.

In block 217 the process performs an action defined for or based on the matching pattern. Alternatively, the process may perform an action defined for a given status of music-based video game play at the time the sequence of stored positions matches a predefined pattern. In some embodiments, the action is to increase a point score for the game player or to apply a multiplier to an increase in points determined as part of music-based video game play. In some embodiments, the action is to execute an in-game event, for example, crowd responses, stadium lighting effects, or other in-game events as described above.

The process thereafter proceeds to block 219 and determines whether the process should exit, although it should be recognized that exit processing may occur through other methods, such as provision of an interrupt signal or otherwise. If the process is not to exit, the process goes to block 209, otherwise the process returns.

Alternatively, in some embodiments in blocks 211 the process may determine game player positions for a plurality of game players, and in block 213 the process may store an indication of game player position-related information for the plurality of game players. Processing of blocks 215 and 217, therefore, may be performed for sequences of stored positions for each of a plurality of game players, and, in some embodiments, different predefined patterns are utilized for sequences of stored game player positions for different game players. In some embodiments, in block 215, the process may instead determine whether the stored positions for each of the game players indicate synchronized movement of the game players.

Figure 3:
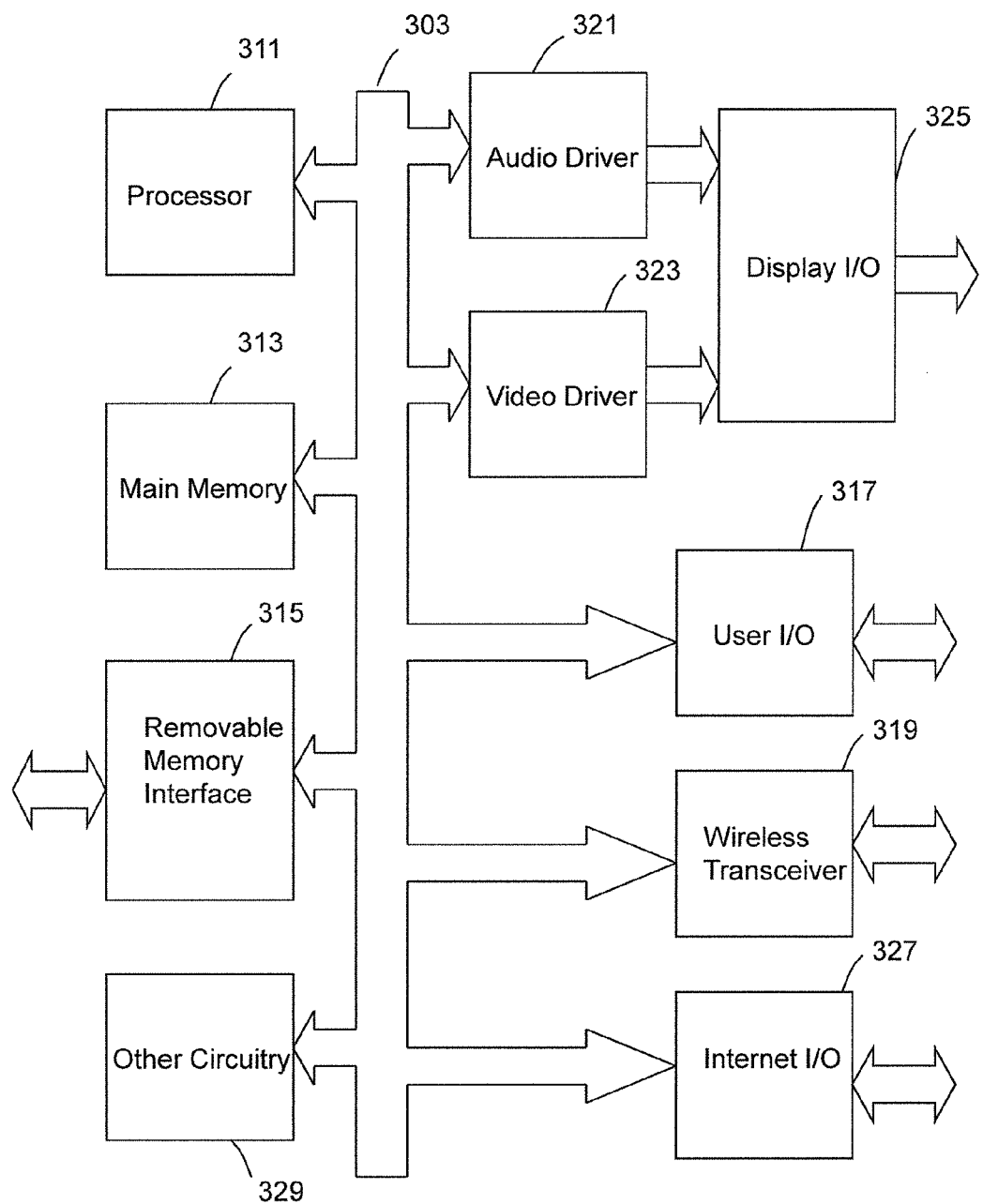
FIG. 3 is a block diagram of a video game console in accordance with aspects of the invention.

FIG. 3 is an example of a block diagram of a video game console in accordance with aspects of the invention. In the embodiment of FIG. 3, the video game console includes at least one processor 311 interconnected with other components via a system bus 303. The other components may include, for example, a main memory 313 of the video game console, a removable memory interface 315, a user input/output port 317, a wireless transceiver 319, an audio driver 321, a video driver 323, an Internet input/output port 327, a display input/output port 325, and other circuitry 329, which may include for example an infrared sensor. In other embodiments of the invention, there may be different combinations of components that make up a video game console, depending on the individual needs of each application.

The processor executes program instructions to provide music-based video game play, for example the music-based video game described with respect to FIG. 1A or 1B, as well as program instructions to provide for a user physical performance aspect to game play, for example as described with respect to FIG. 1A, 1B, or 2. The processor may obtain program instructions from a removable memory source, for example, a video game CD-ROM, inserted into the removable memory interface of the video game console. The processor also receives game player input signals from a motion sensing device and/or a connected video game controller or microphone, through the user input/output port, the wireless transceiver, and/or other circuitry. The processor processes the program instructions and receives input signals to generate audio and video output signals representative of video game play.

The processor may also be in data communication with a display unit, generally combined with one or more speakers, which presents video game action to a game player of the system. The processor may send audio generation information to the audio driver, and video generation information to the video driver, each of which generates audio and video output signals, respectively, from the received generation information. The audio and video drivers forward the audio and video output signals through a combined display input/output port 325, or alternatively, separate audio and video input/output ports, to the display unit.

In some embodiments, the processor is also connected to the Internet via either the Internet input/output port, or via the wireless transceiver. A connection to the Internet may be used to facilitate multiplayer game play with other game players in remote locations in a multiplayer option. In some embodiments, an Internet connection may also be used by video game publishers to offer, for free or for sale, downloadable content associated with a particular game. In a music-based video game, downloadable content may include, for example, new songs, background audio tracks or other content.

Figure 4:
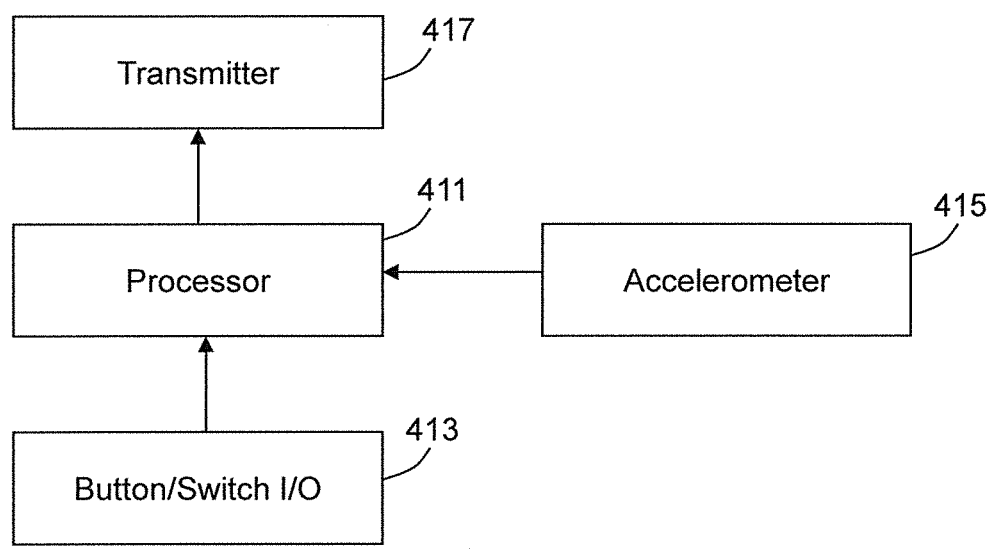
FIG. 4 is a block diagram of an example controller in accordance with aspects of the invention.

FIG. 4 is a block diagram of a controller in accordance with aspects of the invention. The controller generally provides controller signals, for example signals commonly provided by controllers to video game consoles, with the controller signals including for the controller of FIG. 4 position-, location-, and orientation-related signals. The controller includes a processor 411. The processor may be a digital signal processor in some embodiments, for example including analog input pins, or the processor may be any of a wide variety of programmable devices, with in some cases analog-to-digital converters also being provided to convert analog signals from other components to digital signals. As shown in FIG. 4, the processor receives signals from button/switch I/O 413, although in many embodiments other inputs may be provided, as shown in FIG. 1C. The button/switch I/O may include a variety of input buttons, for example fret or strum related buttons of a guitar controller, and possibly may include analog inputs, for example as provided by a moveable bar coupled to a potentiometer, depending on the configuration of the controller. As illustrated, the controller includes an accelerometer 415 (in some embodiments a three-axis accelerometer), which provides signals to the processor. Although an accelerometer is shown in FIG. 4, in various embodiments additional accelerometers and/or other motion sensing devices may instead or in addition be used (e.g., geomagnetic sensors, gyroscopes, altimeters, magnetometers, optical or infrared transceivers, GPS devices, and thermal imaging devices). In addition, the controller is coupled to a transmitter, which may be a wireless transmitter. The transmitter generally transmits signals to the video game console, which receives the signals as input signals. In some embodiments, however, the transmitter may be a transceiver, or the controller may otherwise include receiver circuitry, with the controller also receiving signals from, for example, the video game console. The signals may be, for example, electromagnetic or optical signals, including infrared signals.

Figure 5:
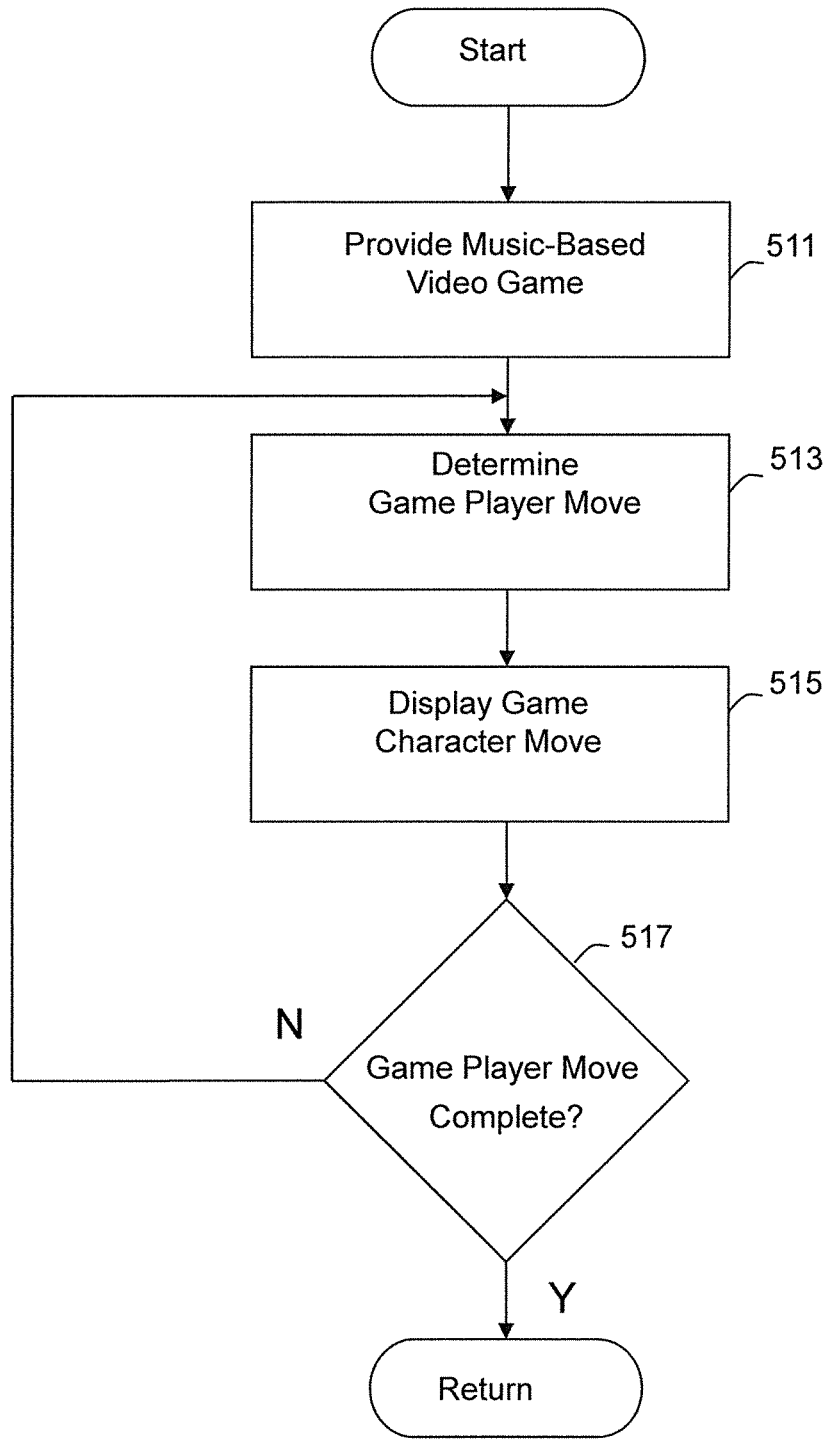
FIG. 5 is a flow diagram of a further process of providing a music-based video game in accordance with aspects of the invention.

FIG. 5 is a flow chart of video game operations in accordance with aspects of the invention. The process may be performed by the video game console of FIG. 1, or a processor of the video game console, for example as discussed below with respect to FIG. 3. In general, the process of FIG. 5 may be used to provide a video game feature in the context of a music-based video game in which movement of a character in the video game generally corresponds to movement of a game player, which in some embodiments may be deduced by movement of a game controller.

In block 511, the process provides for music-based video game play. In many embodiments the process commands display of instructive cues and evaluates game player compliance with the instructive cues, for example based on input signals or movements provided by a controller operated by the game player. In many embodiments, the process also commands presentation of audio of a song or portions of a song, with extent of presentation of the song dependent on extent of compliance by the game player with instructive cues. The process may also provide features of music-based video game play commonly found in music-based video games.

Blocks 513-517 relate to a motion-related processing during music-based video game play. The motion related-processing is for movements of a game player and/or a controller carried by the game player. The movements may be responsive to a prompt provided during music-based video game play, for example a motion of or expression by a game character, or other visual, auditory, tactile or other prompt. Alternatively, in some embodiments the movements may be independent of a prompt provided during game play.

In block 513, the process determines movements of a game player and/or controller. In some embodiments, the game player and/or controller movement may be utilized as a proxy for game player movement. For simplicity of exposition, reference in this example shall be primarily to game player movement. Movements of the game player, for example, may be determined by processing input signals indicative of movement (which may be signals determined by a depth-sensing camera) of the game player. In some embodiments, the process may match movements to predefined patterns or a sequence of predefined patterns. For example, predefined patterns may include the game player rotating (or moving laterally) to either the left or the right. In some embodiments, the process filters game player movements that do not exceed a certain threshold. For example, the process may disregard the rotation of the game player's body if the rotation does not exceed a predetermined rate of rotation, predetermined amount of rotation, or both. Similarly, the process may disregard the player's lateral movement if the lateral movement does not exceed a predetermined velocity, distance, or both.

In block 515, the process commands display of movement of a game character or a viewpoint of the game character. In many embodiments, the game character is a character in a music-based video game controlled by the game player, and the game is viewed from the viewpoint of the game character. In some embodiments, the game character is a character in a music-based video game, and the game is viewed from a viewpoint other than that of the game character. In some embodiments, the game character movements, and/or movements of the instrument held by the game character, correspond to movement of the game player and/or controller held by the game player as determined in block 513. For example, if the game player rotates his head or body to the left (or right), the viewpoint of the game character (or the game character himself) may corresponding rotate his head or body to the left (or right).

In block 517, the process determines if the movement of the game player is complete. In some embodiments, the process may determine that the movement of the game player is complete if the game player's movement no longer exceeds a predetermined threshold. For example, the process may determine that a game player has completed rotating his body if the game player's body rotation no longer exceeds a predetermined rate of rotation. Similarly the process may determine that a game player has stopped moving to the left if the game player has decelerated his lateral movement by a determined amount. If the game player movement is not complete, the process goes to block 513 and determines further game player movement. Otherwise, the process returns.

Figure 6:
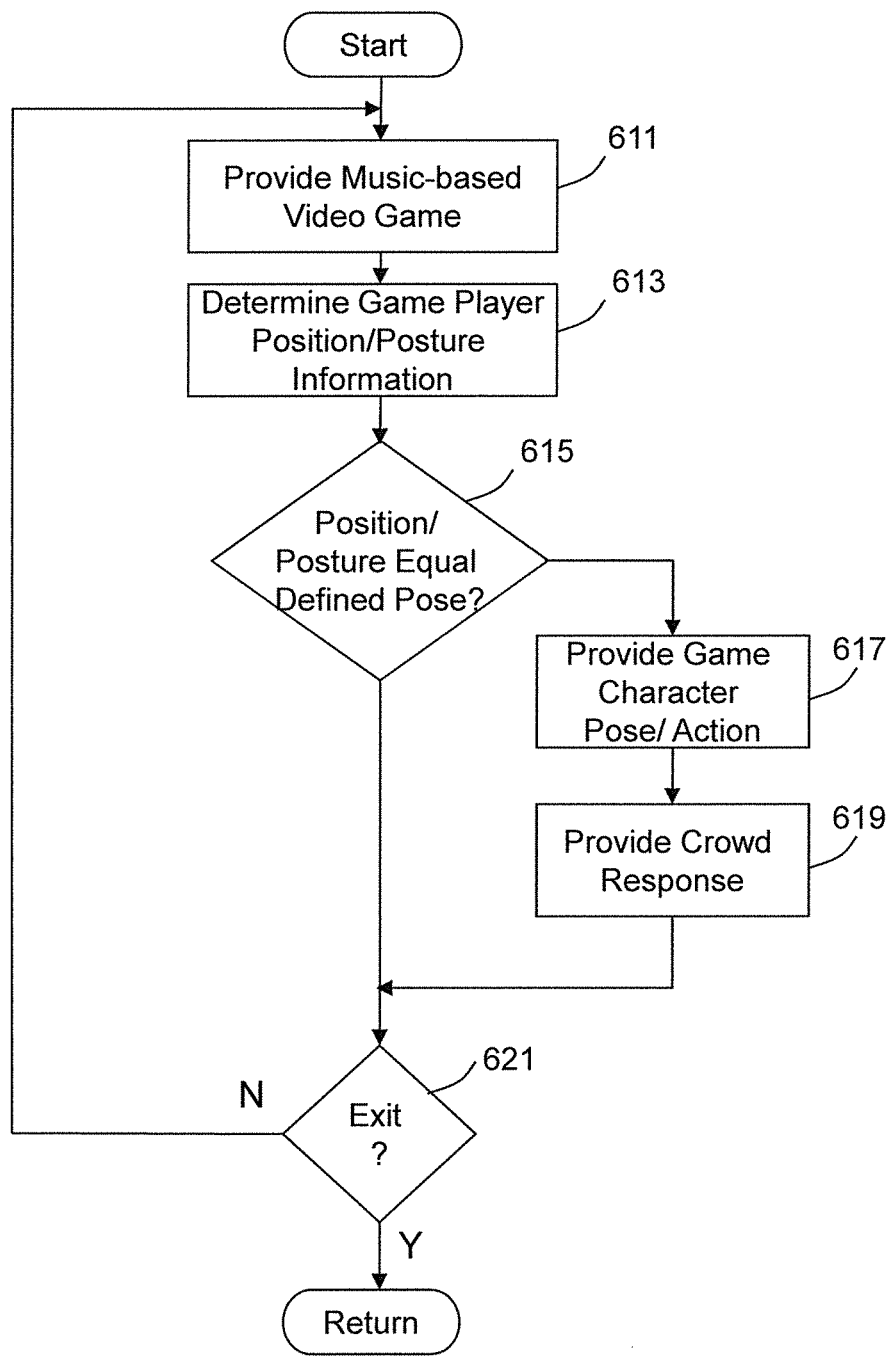
FIG. 6 is a flow diagram of a further process of providing a music-based video game in accordance with aspects of the invention.

FIG. 6 is a flow diagram of a process in accordance with aspects of the invention. The process of FIG. 6 may be performed, for example, by the system of FIG. 1, a compute device, or a processor of a compute device, in various embodiments.

In block 611 the process provides for play of a video game, for example a music-based video game. In some embodiments the process may provide for play of the video game by commanding presentation of instructive cues, for example on a display, and determine game player compliance with the instructive cues, for example by evaluating inputs from a user input device, for example a game controller. In various embodiments the presentation of instructive cues and/or determination of game player compliance may be accompanied by play of a musical selection, with the play of, the musical selection affected by extent of game player compliance with the instructive cues.

In block 613 the process determines game player position or posture information. In some embodiments the process determines relative game player position, for example indicating a move in one direction or another, with the directions being to the left or right with respect to a display in some embodiments, or closer or farther from a display in other embodiments. In some embodiments the process determines game player posture, which may be for example a posture of the game player's body or a portion of the game player's body. For example, in some embodiments the game player's posture may be a raised arm of the game player, a bent over posture of the game player, or a kneeling posture of the game player. In some embodiments the process determines game player position or posture information based on game player position-related information provided by a game controller. In some embodiments the process determines game player position or posture information based on signals provided by a camera or other optical device.

In block 615 the process determines if the game player position or posture information indicates that the game player has a predefined pose. For example, in some embodiments the process determines if the game player is kneeling, in some embodiments the process determines if the game player has arms raised above the game player's head, in some embodiments the process determines if the game player has hands together above the game player's head, in some embodiments the process determines if the game player is kneeling, in some embodiments the process determines if the game player is to a left of a display or play area, and in some embodiments the process may determine if the game player is pointing. If the process determines that the game player position or posture information indicates a predefined position or posture the process continues to block 617, otherwise the process continues to block 621.

In block 617, which is optional or not performed in some embodiments, the process commands presentation, for example on a display, of a game character taking the predefined pose, or some other predefined pose. For example, in some embodiments the predefined pose may be that of a single arm raised above the head, and the process may command presentation of the game character raising a single arm above the head. In some embodiments the predefined pose may be mapped to some other pose, for example the predefined pose may be that of a single arm raised above the head, and the process may command presentation of the game character clapping with both hands above the head.

In block 619, which is optional or not performed in some embodiments, the process commands presentation, for example on the display, of a crowd response. The crowd, for example, may be an audience of people in a game world, for example viewing a presentation, which may be that of a musical performance. The crowd response may be, in some embodiments, members of the crowd clapping their hands, possibly in unison, in response to a game player position or pose, or a game character position or pose indicative of a request for members of a crowd to clap their hands. In some embodiments the crowd response may be to increase or decrease a volume of crowd generated noise, or to stand (or sit), or a variety of other responses a crowd may make.

In block 621 the process determines if the process should exit, for example if game play is over. If so, the process returns. Otherwise the process continues back to block 611.

Figure 7:
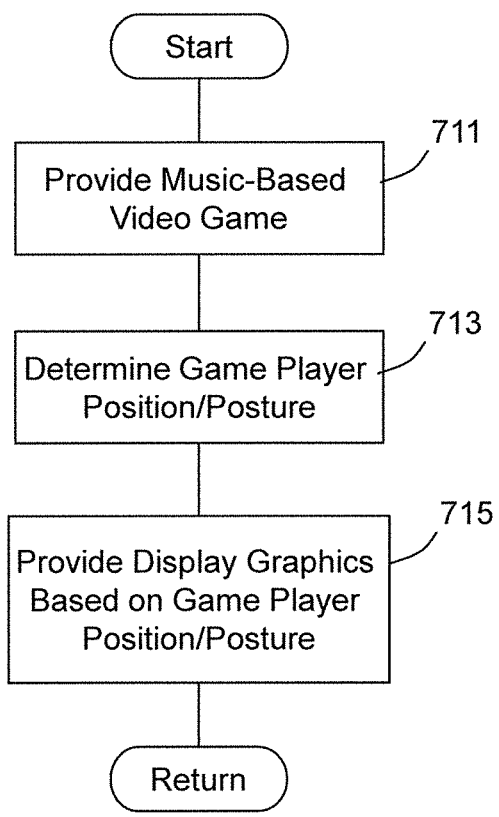
FIG. 7 is a flow diagram of a further process of providing a music-based video game in accordance with aspects of the invention.

FIG. 7 is a flow diagram of a process in accordance with aspects of the invention. The process of FIG. 7 may be performed, for example, by the system of FIG. 1, a compute device, or a processor of a compute device, in various embodiments.

In block 711 the process provides for play of a video game, for example a music-based video game. In some embodiments the process may provide for play of the video game by commanding presentation of instructive cues, for example on a display, and determine game player compliance with the instructive cues, for example by evaluating inputs from a user input device, for example a game controller. In various embodiments the presentation of instructive cues and/or determination of game player compliance may be accompanied by play of a musical selection, with the play of the musical selection affected by extent of game player compliance with the instructive cues.

In block 713 the process determines game player position or posture information. In some embodiments the process determines relative game player position, for example indicating a move in one direction or another, with the directions being to the left or right with respect to a display in some embodiments, or closer or farther from a display in other embodiments. In some embodiments the process determines game player posture, which may be for example orientation of a game player's head. For example, in some embodiments the game player's head may indicate a game player facing to the left or to the right.

In block 715 the process commands display of game scenes based on the game player position or posture information. For example, the game scenes may be reflective of a scene in a game world as viewed from a point of view, with the point of view based, at least in part, on the game player position or posture information.

The process thereafter returns.

Although the invention has been discussed with respect to certain embodiments, it should be recognized that the invention comprises the novel and non-obvious claims and their insubstantial variations supported by this disclosure.

What is claimed is:

1. A method, performed by a compute device, of conducting a music-based video game, comprising:
    commanding, by the compute device, presentation of a game scene on a display;
    commanding, by the compute device, presentation of instructive cues for operation of a guitar-shaped controller including a plurality of fret buttons and a strum bar, the instructive cues including instructive cues for activation of the fret buttons and strum bar;
    determining, by the compute device, compliance with the instructive cues by a game player operating the guitar-shaped controller;
    determining, by the compute device, a rotational change in an orientation of the guitar-shaped controller;
    commanding, by the compute device, a change in the presentation of the game scene, wherein the change in the presentation of the game scene corresponds to the rotational change in the orientation of the guitar-shaped controller;
    commanding display of a game character representing the game player;
    determining a movement of the guitar-shaped controller, wherein the movement of the guitar-shaped controller is different from the rotational change in the orientation of the guitar-shaped controller; and
    commanding display of an action of the game character, that does not mimic an action indicated by the movement of the guitar-shaped controller, in response to the movement of the guitar-shaped controller.

2. The method of claim 1, wherein the rotational change in the orientation of the guitar-shaped controller is determined using at least an accelerometer.

3. The method of claim 1, wherein the rotational change in the orientation of the guitar-shaped controller is determined using at least a gyroscope.

4. The method of claim 1, wherein the rotational change in the orientation of the guitar-shaped controller is determined using at least an optical sensor.

5. The method of claim 1, wherein the rotational change in the orientation of the guitar-shaped controller is determined using at least a depth-sensing camera.

6. The method of claim 1, wherein the game scene comprises a crowd of people.

7. The method of claim 6, wherein the rotational change in the orientation of the guitar-shaped controller is indicative of a point of view of a game world including the crowd of people.

8. The method of claim 1, further comprising determining, by the compute device, if the rotational change in the orientation of the guitar-shaped controller exceeds a predetermined amount of rotation, and wherein the change in the presentation of the game scene corresponding to the rotational change in the orientation of the guitar-shaped controller is only performed if the rotational change in the orientation of the guitar-shaped controller exceeds the predetermined amount of rotation.

* * * * *